H. T. SHELTON, F. W. STEERE & C. POWER.
COLLAPSIBLE TRANSPORT BOX.
APPLICATION FILED JUNE 2, 1913.

1,104,389.

Patented July 21, 1914.

Witnesses:
M. E. McKade
C. F. Kesler

Inventors
Henry T. Shelton
Frederick W. Steere
Charles Power by James L. Norris
Attorney

THE NORRIS PETERS CO., WASHINGTON, D. C.

UNITED STATES PATENT OFFICE.

HENRY THOMAS SHELTON, FREDERICK WALTER STEERE, AND CHARLES POWER, OF BUNBURY, WESTERN AUSTRALIA, AUSTRALIA.

COLLAPSIBLE TRANSPORT-BOX.

1,104,389.　　　　Specification of Letters Patent.　　Patented July 21, 1914.

Application filed June 2, 1913.　Serial No. 771,336.

*To all whom it may concern:*

Be it known that we, HENRY THOMAS SHELTON, FREDERICK WALTER STEERE, and CHARLES POWER, subjects of the King of Great Britain, residing at Bunbury, Western Australia, Commonwealth of Australia, have invented certain new and useful Improvements in Collapsible Transport-Boxes, of which the following is a specification.

This invention relates to collapsible transport boxes, and it proposes, briefly, a structure of the general character or class indicated having certain hereinafter-described improvements embodied in its end members and in the means for connecting the same with the sides, whereby the box may be caused to flatten out when collapsed, for economy of space during shipment.

Figures 1, 2:
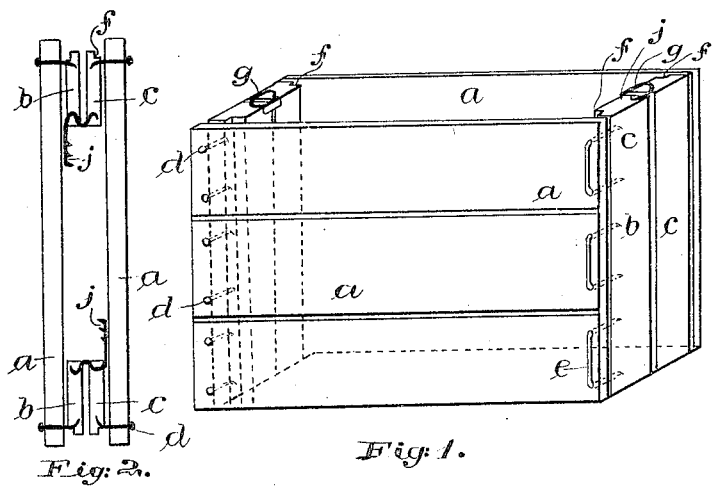
Figure 3:
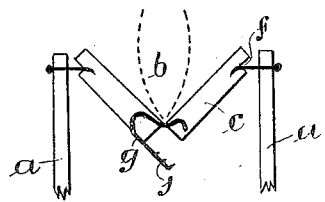
Figure 5:
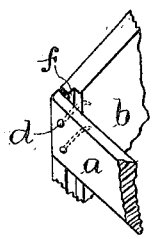

In the accompanying drawing: Figure 1 is a perspective view of a box constructed in accordance with this invention in expanded condition; Fig. 2 is a view in elevation showing the box collapsed and stood on end; Fig. 3 is a detail view showing one end of the box partly expanded, the dotted lines denoting the direction of the opening and closing movements; and Figs. 4 and 5 are detail corner views showing the box fully open, the said figures illustrating the use of staples and nails, respectively, as the hinge agents.

For the sake of clearness, the various hinge agents are shown in solid black.

As represented in said drawing, the present invention contemplates the employment of divided members for the ends of the box, in place of the ordinary one-piece or unitary members, the sides $a$, however, being of the usual type. The afore-mentioned ends may be composed of any desired number of sections, in this instance, two, indicated by the reference characters $b$ and $c$. The sides $a$ may be hingedly connected to these sections, either by flexible nails $d$, or by flexible staples $e$, the latter being depicted in Fig. 4 and in the front right-hand corner of Fig. 1. The outer longitudinal edges of the end sections are formed with rabbets $f$, into which the nails or staples are driven, as represented in Figs. 2 to 5, such rabbeted construction providing an easy hinge action or motion for the box members.

Figure 4:
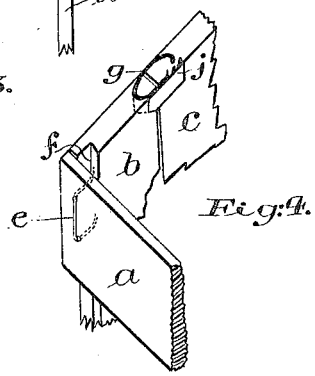

The sections or parts of the box ends are themselves connected at their top and bottom by means of flexible metal tongues $g$ of the shape shown, these tongues having overlapping terminals $j$ made with serrated edges which, on being driven or clenched into the opposite companion end sections, constitute a rigid lock for said sections when the box is expanded, as will be understood from Figs. 1 and 4. The said tongues act, therefore, as hinges for the sections of the box ends and allow them to freely fold up or open out, after the serrated terminals $j$ have been withdrawn.

What we claim as our invention and desire to secure by Letters Patent is:—

1. A collapsible transport box having ends, each composed of a plurality of sections; and flexible tongues hingedly connecting the sections of each end, said tongues having serrated and overlapping terminals operative to lock said end sections in open position.

2. A collapsible box of the character described having ends, each composed of a plurality of sections; and an inherently flexible metal strip, the intermediate portion of which forms a hinge between the adjacent edges of said end sections, and the terminal of which is adapted to be forcibly engaged with said sections to lock the same in alinement.

In testimony whereof we have hereunto set our hands in presence of two subscribing witnesses.

HENRY THOMAS SHELTON.
　　　　FREDERICK WALTER STEERE.
　　　　CHARLES POWER.

Witnesses:
　G. C. MONEY,
　C. C. JENOUR.

---

Copies of this patent may be obtained for five cents each, by addressing the "Commissioner of Patents, Washington, D. C."